United States Patent [19]

Wadleigh

[11] 4,164,367
[45] Aug. 14, 1979

[54] FILM TRANSPORT SYSTEM FOR MICROFILM READER

[75] Inventor: Edward R. Wadleigh, Hemet, Calif.
[73] Assignee: Bell & Howell Company, Chicago, Ill.
[21] Appl. No.: 814,933
[22] Filed: Jul. 12, 1977
[51] Int. Cl.² .......................................... G03B 23/12
[52] U.S. Cl. ............................................. 353/26 R
[58] Field of Search ............... 353/26, 27, 78, 63, 353/99, 74, 75, 76, 77

[56] References Cited

U.S. PATENT DOCUMENTS

| | | | |
|---|---|---|---|
| 3,551,042 | 12/1970 | Brink et al. | 353/76 |
| 3,806,235 | 4/1974 | Wangerin | 353/26 R |
| 3,822,091 | 7/1974 | Altmann | 353/26 R |
| 3,885,867 | 5/1975 | Nelson et al. | 353/27 |
| 3,973,344 | 8/1976 | Frankel | 353/27 R |

Primary Examiner—Richard E. Aegerter
Assistant Examiner—John W. Shepperd
Attorney, Agent, or Firm—Harry G. Thibault; Alan B. Samlan

[57] ABSTRACT

A film transport and control system for a microfilm image projection system having a single joy-stick operator device which controls both vertical scan and film speed in forward and reverse. At higher film speeds, in both directions, the glass flats between which the film passes across the projection station are separated to prevent scratching the film.

7 Claims, 7 Drawing Figures

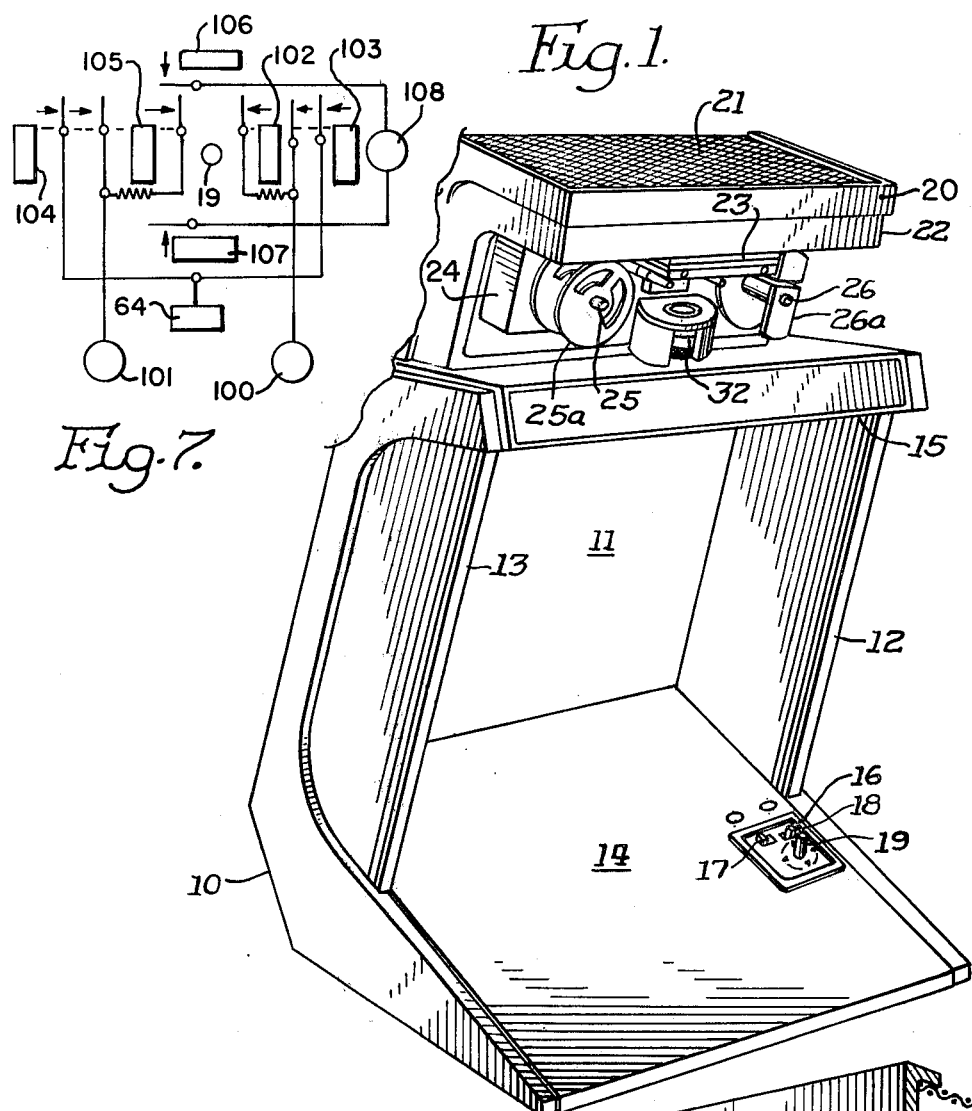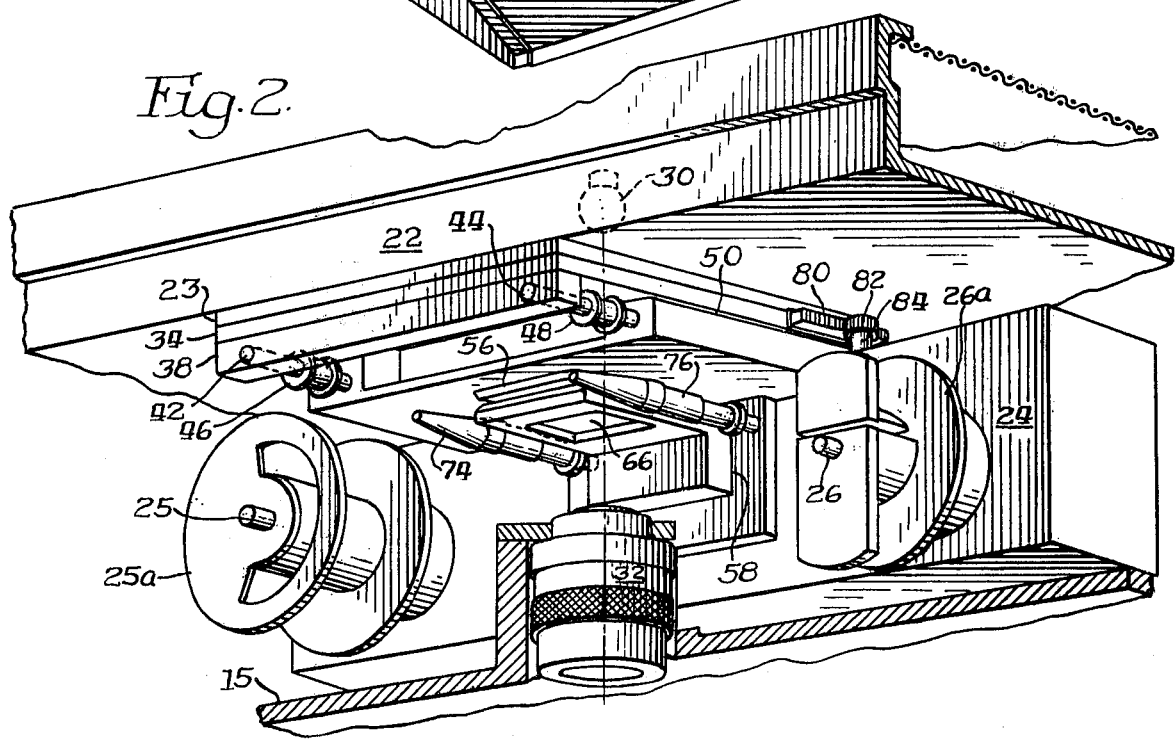

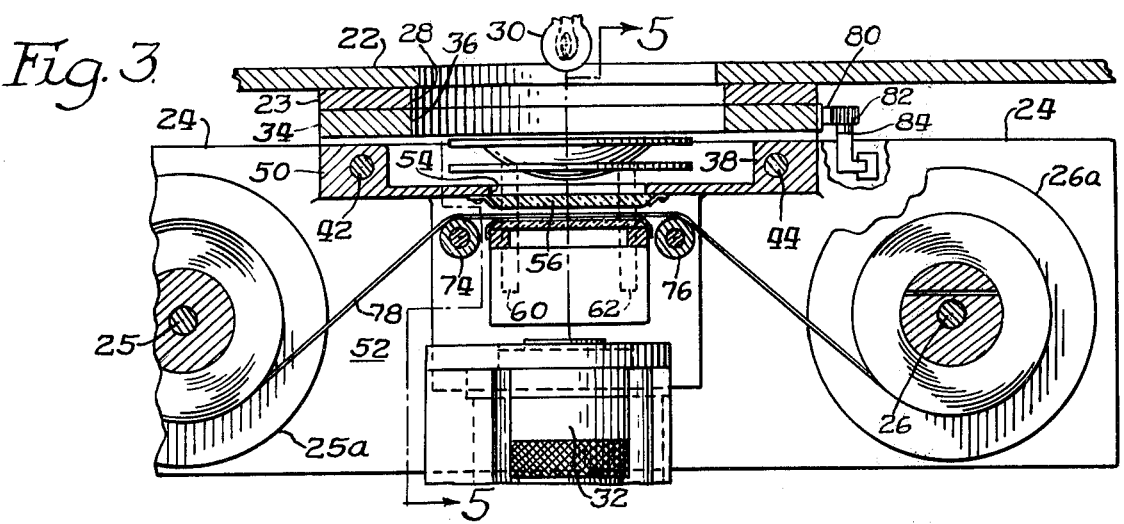
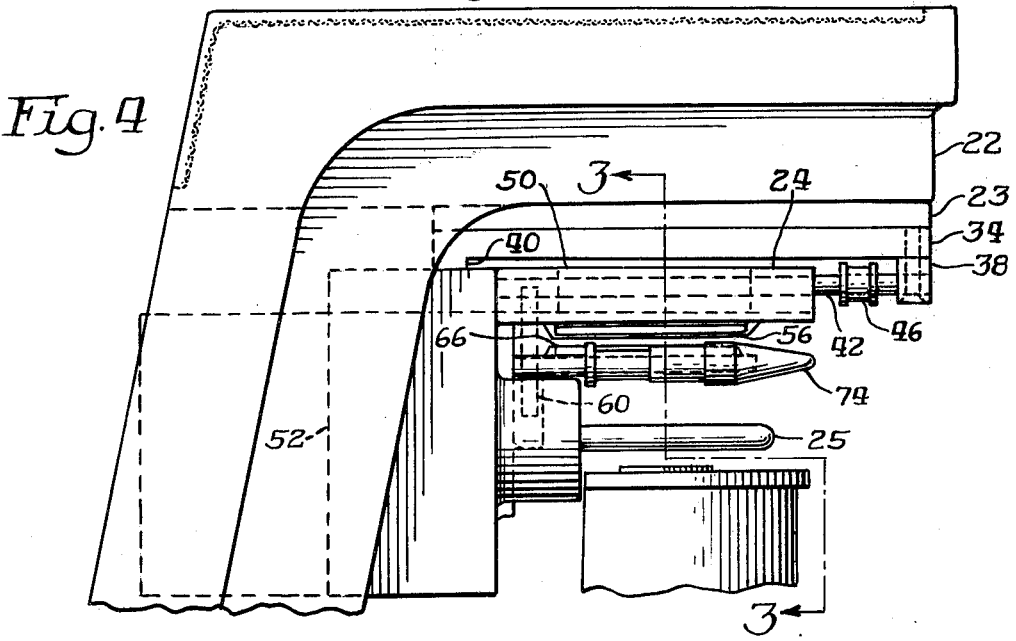
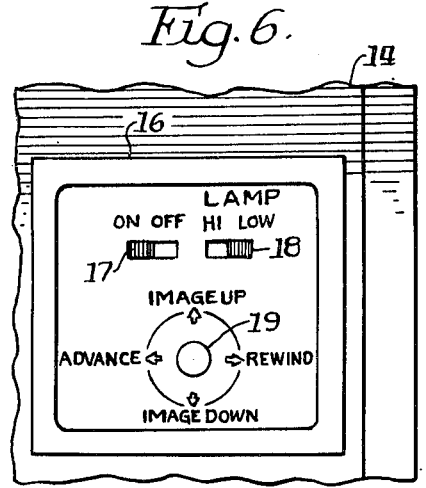
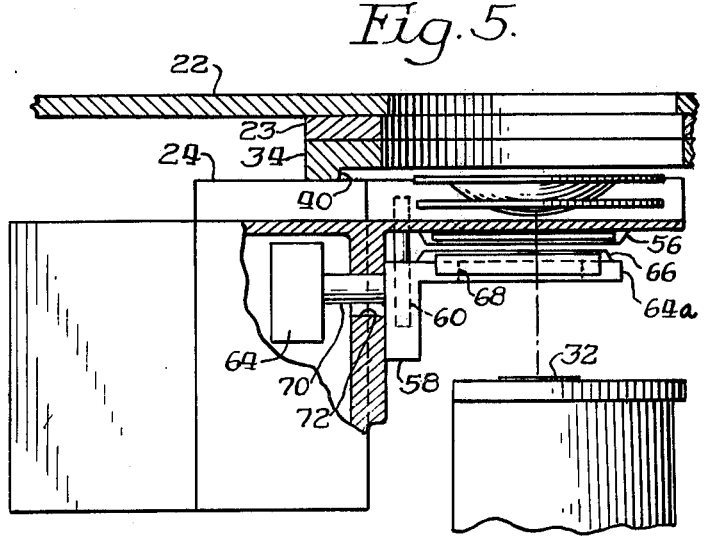

FILM TRANSPORT SYSTEM FOR MICROFILM READER

This invention relates to film transport systems and more particularly, to microfilm transport systems for newspaper readers wherein a single operator mechanism advances and reverses film, controls speed, and controls vertical scan.

The adoption of microfilm for visual information storage requires compatible equipment for rapid and accurate retrieval of the stored images. Microfilm is typically retained on a flanged spool or reel. Means may be provided for identifying the information contained therein, and may also include the exact location of the particular information along the length of the film.

Stored information is typically retrieved by a microfilm reader which includes apparatus for transporting the film through a projection path which includes a magnifying lens system for enlarged display of individual images on an integral display screen. The microfilm reader may also include auxiliary equipment for permanently reproducing the stored information through various photographic or electrostatic methods. Mechanically, the heart of a microfilm reader, and the area wherein most of the problems lie, is the film transport apparatus. The apparatus must be capable of accurately and reliably moving the film past an aperture for projection onto the display screen. In addition, it must be of economical and simple construction and must be easily serviced. The apparatus must be capable of moving the film at selectively variable velocities without imposing inordinate stress upon the film or scratching the film while maintaining some film tension to prevent jamming during movement. Ideally, the apparatus will also provide for vertical scan and easy image rotation.

In the past, numerous arrangements have been proposed for film transport systems. When used in conjunction with film viewing apparatus, many of these prior arrangements have become overly complex in design and operation. Little consideration has been given to simplifying operator function or reducing complexity, while maintaining a high degree of operative reliability.

Accordingly, it is an object of this invention to provide an improved arrangement for microfilm transport systems wherein film advance and return, speed, and vertical scan are all controlled through a single operator control.

It is a further object of this invention to provide a modular film transport system, with ease of access to insert and remove film.

It is yet a further object of this invention to provide a film transport system wherein glass flats supporting the film are disengaged during fast forward and fast reverse film feed to prevent scratching the film.

Other objects and features of this invention will become apparent from an understanding of the following descriptions taken in conjunction with the following drawings wherein:

FIG. 1 is a right side perspective view of the microfilm reader embodying the present invention;

FIG. 2 is a front perspective view of the film transport portion of the reader unit depicted in FIG. 1, showing removable supply and take-up reels;

FIG. 3 is an elevation view of the film transport portion of the reader unit shown in FIG. 2;

FIG. 4 is a right side view of the film transport portion of the reader unit shown in FIG. 2;

FIG. 5 is a detail drawing of the film gate actuating mechanism for the reader unit;

FIG. 6 is a detail view of the operator control for the reader unit shown in FIG. 1; and FIG. 7 is a schematic circuit diagram of the electrical control system.

With reference to FIGS. 1, 2, and 3 of the drawings, there is shown a microfilm reader housing incorporating the invention, generally referred to by the reference numeral 10. The reader includes an enclosure having a back wall 11, side walls 12 and 13, a sloping base 14 which serves as a projection screen, and an overhanging top 15.

A plate 16 (FIG. 6) is set into the base 14 and houses an on-off power control switch 17, a lamp intensity switch 18, and a four-way joy switch control 19.

Mounted on top 15 is an inverted L-shaped member 20 which supports a grill 21, lamp housing 22, a box shaped support 23 and the film transport mechanism housing 24. A spindle 25 for mounting a supply reel 25a and a spindle 26 for mounting a take-up reel 26a are attached to the housing 24. Spindles 25 and 26 are operated by motors 100, 101, (FIG. 7) to drive the reels at variable speeds, as will be described. The motors 100, 101 for driving spindles 25 and 26 are located in the film transport housing 24.

Box shaped support 23 is rigidly mounted to the underside of lamp housing 22, and includes an aperture portion 28 therein (FIG. 3) through which light from lamp 30 is projected onto base 14 through lens 32. A second box shaped support 34 having an aperture 36 therein is rotatably mounted to support 23 whereby support 34 and all elements attached thereto rotate through 90° to properly align the image projected on base 14. Support 34 is shaped as an inverted U, and includes depending portions 38, 40 extending downward. A pair of guide rods 42, 44 extend from portion 38 to portion 40, and slidably support film transport mechanism housing 24 for limited lateral movement, as will be described. Bumpers 46, 48 are provided to cushion the forward lateral movement of housing 24 along rods 42, 44.

Film transport housing mechanism 24 includes a laterally extending portion 50, and a larger vertically extending portion 52 (FIG. 4). The two portions are fixed to form a single housing unit. Elongated holes are provided in portion 50 through which guide rods 42, 44 pass, to support housing 24 for lateral movement relative to lamp housing 22, lamp 30, and lens 32, for reasons to be explained.

Laterally extending portion 50 of housing 24 has an aperture 54 therein through which light from lamp 30 passes to base 14. A glass flat 56 is removably mounted to the underside of aperture 54. Glass flat 56 forms one side of the film gate for the disclosed unit. The other side of the film gate includes an inverted L shaped frame member 58 mounted to laterally extending portion 50 of housing 24. Two vertical guide rods 60, 62 extend from portion 50 and extend through a pair of holes in the downwardly extending portion of frame member 58, whereby the frame member moves along the rods 60, 62 (FIG. 5). A solenoid or other suitable actuating means 64 is provided in housing 24 to provide limited movement of frame member 58 in a vertical direction. As frame member 58 moves vertically, the laterally extending portion 66 of frame member 58 moves toward or away from glass flat 56. A second glass flat 66 sits atop an aperture 68 in lateral portion 64a of frame 58, and when frame 58 is moved upward (FIG. 5), the glass flats 56, 66 are close to each other, but not touching, thereby forming a film path beneath lamp 30. Solenoid 64 is mounted inside housing 24, and includes an operating arm 70 fixed to L shaped frame member 58. Arm 70 extends through a slot 72 in housing 24.

A pair of film guide rollers 74, 76 are mounted to portion 52 of housing 24, and are located adjacent film gate member 58. Film 78 from supply reel 25a (FIG. 2) extends over roller 74, between glass flats 56, 66, over roller 76, and onto take-up reel 26a. The images on film 78 are projected on base 14 when light from lamp 30 is projected through apertures 28, 36, 54, through glass flats 56, 66, and through lens 32.

A rack 80 (FIG. 2) is attached to the side of support 34. A pinion is attached to motor driven shaft 84 which rises out of housing 24. Pinion 82 engages rack 34, whereby one rotation of the pinion 35 will transverse the entire rack 34, and move housing 24 laterally along rods 42, 44. Movement of housing 24 will cause vertical scan of the image projected on base 14.

Referring now to FIGS. 6 and 7, the joy switch 19 actuates microswitches 102–107. Microswitches 102, 103 operate motor 100 for controlling spindle 26 for slow and fast forward film speeds and microswitches 104, 105 operate motors 101 for controlling spindle 25 for slow and fast rewind speeds. Microswitches 102–104 also operate solenoid 64 to open and close glass flats 56, 66. Microswitches 106, 107 drive shaft 84 in forward or reverse.

OPERATION

When the joystick 19 is moved upwardly (FIG. 6) to close microswitches 106 (FIG. 7), a motor 108 drives shaft 84 and pinion 82 (FIG. 2) in a counterclockwise direction, moving housing 24 laterally backward along rods 42, 44, thereby moving the image cast from film 78 in an upward direction on base 14. Therefore, if the cast image is cut off at the bottom, movement of joy control 19 upwardly will cause the image to move until the lower portion of the image is in the projection range of lens 32. Conversely, when joy control 19 is moved downward by microswitch 107 operates the same motor 108 and causes shaft 84 and pinion 82 to rotate clockwise, driving housing 24 laterally forward and moving the cast image downward until the top of the image is within the projection range of lens 32.

When joy control 19 is moved partially to the right (FIG. 6), only microswitch 102 is closed to operate the motor 100 driving spindle 26, whereby film 78 is reeled slowly from supply reel 25a to take-up reel 26a. If desired, the motor driving spindle 26 may be of the variable speed type, whereby the speed of film advance is proportional to the degree of rightward movement of joy control 19. Movement of joy control 19 to its full right position closes microswitch 103 (FIG. 7) and actuates solenoid 64 whereby glass flats 56, 66 are separated and the film 78 advances at high speed through the film gate formed between the glass flats. Thus, at high film speed, the glass flats are separated to prevent scratching the film.

When joy control 19 is moved partially to the left (FIG. 6), microswitch 105 (FIG. 7) operates and the motor 101 driving spindle 25 is actuated, whereby film 78 is reeled slowly from take-up reel 26a to supply reel 25a. If desired, the motor 101 driving spindle 25 may also be of the variable speed type, whereby the speed of film rewind is proportional to the degree of rightward movement of joy control 19. Movement of joy control 19 to its full right position operates microswitch 104 and actuates solenoid 64 whereby glass flats 56, 66 are separated as film 78 rewinds at high speed through the film gate formed between the glass flats. Thus, at high rewind speed, the glass flats are separated to prevent scratching the film.

Thus, in accordance with the invention, a single operator mechanism advances and reverses the film, controls speed, controls vertical scan, and opens the film gate to prevent scratching the film at high speeds.

It is obvious that upon study by those skilled in the art, the disclosed invention may be altered or modified both in physical appearance and construction without departing from its inventive concept. Therefore, the scope of protection to be given this invention should not be limited by the embodiment described above, but should be determined by the essential descriptions thereof which appear in the appended claims.

The embodiments of the invention in which an exclusive property of privilege is claimed are defined as follows.

I claim:

1. A microfilm reading apparatus comprising:
   (a) a housing having an image projection means near the top and a large-size inclined image receiving portion inside the base at the bottom;
   (b) means mounted near the top of said housing for transporting image-bearing film past said image projection means to cast an image from said film vertically downwardly onto said portion of said housing which is in a generally horizontal orientation, whereby said-image receiving portion may be used as a desk when it is desirable to make notes from said projected image; and
   (c) said film transport mechanism comprising:
      (i) an electrically driven means including film supply and take-up reels mounted on said housing with means for providing limited lateral movement of said reel mount with respect to said housing, said lateral movement occurring in response to first or second electrical signals;
      (ii) variable speed means for operating said film supply drive means responsive to a third electrical signal;
      (iii) variable speed means for operating said film take-up drive means responsive to a fourth electrical signal;
      (iv) film gate means disposed between said supply and take-up drive means and located in the path of said image projection means, said film gate means including an actuator to move said film gate between a first relatively closed position to a second relatively open position; and
   (d) means responsive to a single multi-position control mechanism mounted on said image-receiving portion
      (i) to selectively supply any of said electrical signals for controlling the speed of said film supply responsive to said third signal and said film take-up drive means responsive to said fourth signal;
      (ii) to control the actuator which moves said film gate between said relatively closed and relatively open positions responsive to either said third or said fourth signals; and
      (iii) to control the lateral movement of said film transport mechanism relative to said housing responsive to either said first or said second signals, whereby movement of said multi-position control mechanism causes movement of said image in the direction in which said control mechanism moves.

2. The apparatus of claim 1 wherein said film gate includes a first glass flat mounted on said film transport mechanism, a second glass flat mounted adjacent said first film flat, said second glass flat mounted on a frame which is movably attached to said film transport mechanism, and said means for actuating said frame moveing said second glass flat away from said first glass flat when said film supply and take-up drive means are operated at their respective maximum speeds to prevent scratching the film.

3. The apparatus of claim 2 including a solenoid to control the movement of said frame, and means responsive to movement of said single multi-position control mechanism to a predetermined position to actuate said solenoid.

4. The microfilm reader as set forth in claim 1 wherein the means for causing the film transport mechanism to move laterally with respect to said housing comprises a pinion means extending from the film transport mechanism engaging a rack means mounted on said housing, a rotation of said pinion means causing said film transport mechanism to move laterally.

5. The microfilm reader of claim 4 including a pair of guide rods fixed to a said housing, said film transport mechanism slidably mounted on said guide rods for limited lateral movement along said rods, a rotation of said pinion means causing said film transport mechanism to slide along said guide rods, said projected image being moved vertically, responsive to said sliding of said film transport.

6. The apparatus of claim 1 including first motor means to drive said film supply means, second motor means to drive said film take-up means, third motor means to control lateral movement of said film transport mechanism, and solenoid means connected to said actuator for said film gate movement means, said single multi-position control mechanism operatively connected to said motors and said solenoid through a series of switching means to actuate said motors and solenoid means.

7. The apparatus of claim 6 wherein the single operator means for controlling the operation of the film transport mechanism is a switch with connecting electrical means which, when moved partially in a first direction causes said first motor to advance said film at a slow rate of speed, and moved fully in said first direction causes the film to advance at a high rate of speed and causes said solenoid to open said film gate; and when moved in a second direction causes the film to rewind at a high rate of speed and causes said solenoid to open said film gate; and when moved in a third direction causes said third motor to move said film transport mechanism in a forward direction perpendicular to the direction of film advance, and when moved in a fourth direction causes said third motor to move film transport mechanism in a rearward direction.

* * * * *